United States Patent [19]
Yasui

[11] Patent Number: 5,904,992
[45] Date of Patent: May 18, 1999

[54] FLOATING SUPERPLASTIC FORMING/ DIFFUSION BONDING DIE, PRODUCT AND PROCESS

[75] Inventor: Ken K. Yasui, Huntington Beach, Calif.

[73] Assignee: McDonnell Douglas Corporation, Huntington Beach, Calif.

[21] Appl. No.: 08/720,226

[22] Filed: Sep. 26, 1996

[51] Int. Cl.⁶ .................................................. B23K 20/14
[52] U.S. Cl. ......................... 428/593; 228/44.3; 228/157; 428/594
[58] Field of Search .................................. 228/157, 44.3; 428/594, 593

[56] References Cited

U.S. PATENT DOCUMENTS

| | | |
|---|---|---|
| 4,087,037 | 5/1978 | Schier et al. . |
| 4,426,032 | 1/1984 | Leodolter . |
| 5,069,383 | 12/1991 | Copper et al. . |
| 5,276,966 | 1/1994 | Grant et al. .......................... 228/157 X |
| 5,285,573 | 2/1994 | LeMonds et al. . |
| 5,344,063 | 9/1994 | Johnston et al. . |

*Primary Examiner*—Kenneth J. Ramsey
*Attorney, Agent, or Firm*—Alston & Bird LLP

[57] ABSTRACT

A two-sheet superplastically formed/diffusion bonded panel is made with a forming die assembly in which forming cavities are held in a flexible retaining sheet that floats in a forming box. A gas passage is provided through the box behind the cavities and the retaining sheet so that the cavities and retaining sheet are forced toward a rigid face sheet forming die element when pressurized gas is introduced. A face sheet and a reinforcing sheet sealed together around their edges, except for a gas passage to provide pressurized gas between the two sheets, are placed between the face sheet die and the forming die elements positioned in the box. The sheets are then heated and pressurized gas is applied between the sheets to cause the face sheet to move into contact with the face sheet die element while the reinforcing sheet superplastically deforms into the cavities supported by the retaining sheet to form ribs. After the ribs are formed in the reinforcing sheet, the pressure between the face and reinforcing sheets is reduced and the pressure in the box behind the cavity retaining sheet and die cavities is increased so that the formed sheet is moved against the face sheet for bonding. For dimple, as opposed to rib reinforced parts, dimples are created in a grid by shaped blocks facing the reinforcing sheet, which blocks are attached at their base to a flexible retaining sheet acted upon by pressurized gas in the gas chamber.

19 Claims, 6 Drawing Sheets

FLOATING SUPERPLASTIC FORMING/ DIFFUSION BONDING DIE, PRODUCT AND PROCESS

BACKGROUND OF THE INVENTION

Many forming die tools and processes for producing structures such as parts and panels from suitable sheet materials, which are sequentially formed superplastically and then diffusion bonded, are available. Unfortunately, the dies are subject to dimensional variations from manufacturing tolerances and temperature expansion, which make them difficult to design so that suitable pressure is applied by the dies at the right portions during fabrication of the structures to assure the desired diffusion bonding. This is especially true when curved or compound curved structures are being produced where a slight differential expansion, contraction or dimensional inaccuracy can result in improper mating of large areas of the dies.

Patents, such as U.S. Pat. No. 3,340,101 to Fields, Jr. et al.; U.S. Pat. No. 3,920,175 and U.S. Pat. No. 3,927,817 to Hamilton et al.; U.S. Pat. No. 5,069,383 to Cooper et al.; and U.S. Pat. No. 5,344,063 to Johnston et al. disclose methods of superplastic forming and diffusion bonding (SPF/DB) panel structures. However, generally the disclosed processes and tools are limited to either simultaneous forming and bonding or the use of maskants, also known as "stop off", in areas where bonding is not desired. Where a two-sheet SPF/DB process is desired, the use of maskants is possible. Unfortunately, maskants can affect the diffusion bond integrity of the sheets used during the process and must be very carefully handled. The maskants operate by preventing diffusion bonding from taking place in the areas where the maskant has been silk screened onto one of the adjoining sheet surfaces. It has proved to be very difficult to control the location of the maskant, particularly when panels have compound curves. If the maskant is not placed perfectly longitudinally, laterally and rotationally, the process fails, resulting in wrinkles, folds and other undesirable structural defects. One solution is shown in U.S. Pat. No. 5,285,573 to LeMonds et al., which discloses the use of diffusion bonding and then superplastic forming so that maskant can be avoided, or at least errors in maskant positioning can be discovered before the costs associated with superplastic forming are expended.

One solution to the problem of building two sheet SPF/DB structures is shown in U.S. Pat. No. 4,087,037 by Schier et al. and assigned to the McDonnell Douglas Corporation. The dies and tools disclosed by Schier et al. are primarily for making two sheet structures where a stiffener sheet is superplastically deformed into a rigid die to form reinforcing depressions and then the deformed sheet is diffusion bonded to a relatively planar face sheet. Any minor imprecision of the dies is overcome by using a flexible die sheet adjacent the face sheet to force the face sheet into diffusion bonding contact with the superplastically formed stiffener sheet. The relatively flexible die sheet is forced into the face sheet by the pneumatic expansion of a stainless steel bag trapped between the flexible die sheet and a backup die that only needs to approximate the shape of the face sheet. The flexible die sheet moves the face sheet into position for bonding and applies relatively even pressure to assure proper bonding. However, diffusion bonding temperatures are slightly higher than superplastic forming temperatures for the same alloy (between 1500 and 1750° F.) so the forces applied by the bag through the flexible die sheet to the face sheet have a tendency to permanently deform the face sheet in areas where it is not supported by the rigid die. The resultant panel or structure has undesirable face sheet depressions. Since such structures are often used on aerodynamically critical exteriors of aerospace vehicles, dimples, valleys or other deformations are unacceptable, and the parts must be built up with smooth exterior skins connected with fasteners to the superplastically formed structures, which is not cost efficient, or made by the four sheet SPF/DB process as shown in Hayase, et al., U.S. Pat. No. 4,217,397, that is overkill for structures that will be lightly loaded. U.S. Pat. No. 4,426,032 by Leodolter, also assigned to McDonnell Douglas Corp., discloses an improvement to the Schier et al. tools that includes a face sheet die plate with flexible edges so that gas pressure can be used to force the die plate down on the face sheet.

Therefore, there has been a need for improved tooling that can be used to form two sheet SPF/DB parts.

BRIEF SUMMARY OF THE INVENTION

The present invention provides die tooling with which it is possible to assure sound diffusion bonding, not only for forming flat surface panel structures, but also for forming curved and double curved surface structures. It does not require the use of maskants.

The die tools of the present invention can be used to form two-sheet superplastically formed/diffusion bonded (SPF/DB) beaded panels or hat section panels with sound diffusion bonding. The die tool includes a forming die in which the forming cavities are retained in relative position by a relatively flexible retaining sheet, which allows the forming cavities move up and down, or "float" in a forming box at elevated temperature. The forming die includes three main parts: forming cavities; a retaining sheet in which the cavities are located; and a box frame that secures the retaining sheet around its periphery. A gas passage is provided through the box behind the cavities and the retaining sheet so that the cavities and retaining sheet assembly can be moved by the application of gas pressure in the gas chamber created between them and the box.

To form a two-sheet structure, two sheets, in a forming pack with welded edges, are placed in the floating forming die assembly just as if it were a conventional solid forming die assembly having a generally flat face sheet forming die and one with cavities therein. The present invention differs from Schier et al. in that the face sheet forming die is stiff to prevent undesirable face sheet dimples, valleys, and other depressions from being formed. The forming pack of a face sheet and a reinforcing sheet is sealed around its edges by the welding except for a gas passage used to direct forming gas between the two sheets. The forming pack in position between the relatively stiff face sheet forming die and the flexible cavity containing die assembly positioned in the box, is then heated to superplastic forming temperatures (1450 to 1700° F.). Pressurized inert gas is introduced between the two sheets, causing the face sheet to move into contact with the stiff face sheet forming die while what will become the reinforcing sheet superplastically forms into the cavities supported by the retaining sheet to create valleys therein. During this time, near equal pressure is applied between the box and the retaining sheet to prevent excessive deflection of the retaining sheet. After the valleys are formed in the reinforcing sheet by superplastic deformation, the pressure between the face and the reinforcing sheets may be reduced and the pressure in the box behind the retaining sheet and die cavities is increased above the pressure between the face and the reinforcing sheets. This causes the cavity retaining sheet to lift the non-deformed areas of the reinforcing sheet against the face sheet. The box pressure maintains even bonding pressure across the die cavities and the retaining sheet, pneumatically applying sufficient force at areas of contact between the reinforcing sheet and the face sheet to assure sound diffusion bonding. In this way, a structure with hollow reinforcing ribs is constructed without the use of maskants and without causing unwanted face sheet deformation into the hollow reinforcing ribs of the reinforcing sheet.

A panel with a reinforcing sheet having a grid of dimples in a waffle pattern can be created by substituting a flexible die, which includes a relatively flexible, block retaining sheet with shaped blocks attached at their bases thereto, for the flexible cavity containing die. As before, after placing the forming pack in the die assembly and heating the forming pack, pressure is applied between the sheets of the forming pack to cause the reinforcing sheet to expand around the blocks to form a grid with dimples therein extending toward the face sheet. After the reinforcing sheet has been formed, pressure is applied in the box behind the blocks and the retaining sheet above that pressure being maintained between the face and reinforcing sheets, which causes the blocks to lift and push the dimpled portions of the reinforcing sheet into the relatively flat face sheet. Any flexure of the retaining sheet between the blocks, due to the application of differential pressure toward the face sheet, creates areas of compound curvature toward the face sheet of the grid. This grid with compound curvature is spaced from the face sheet and stiffens the finished structure while the relatively flat face sheet remains undeformed.

In addition to titanium superplastic forming with diffusion bonding, the present process can also be used for aluminum superplastic forming with diffusion bonding or with braze bonding for more economical automotive part applications.

Therefore, it is an object of the present invention to provide an improved SPF/DB two-sheet forming process and the tools to perform the process where one of the two sheets has accurate surface curvature and the other has reinforcing ribs or a dimpled reinforcing grid formed therein.

Another object is to provide an improved two-sheet SPF/DB forming process that uses no maskants.

Another object is to provide improved die assemblies that can be used to economically form reinforced panel structures from two superplastically formable sheets.

Another object is to provide a two-sheet SPF/DB forming process wherein any inaccuracies in the forming dies result in inaccuracies in the finished part in areas where such do no harm.

These and other objects and advantages of the present invention will become apparent to those skilled in the art after considering the following detailed specification, together with the accompanying drawings, wherein:

DETAILED DESCRIPTION OF THE SHOWN EMBODIMENTS

Figure 1:
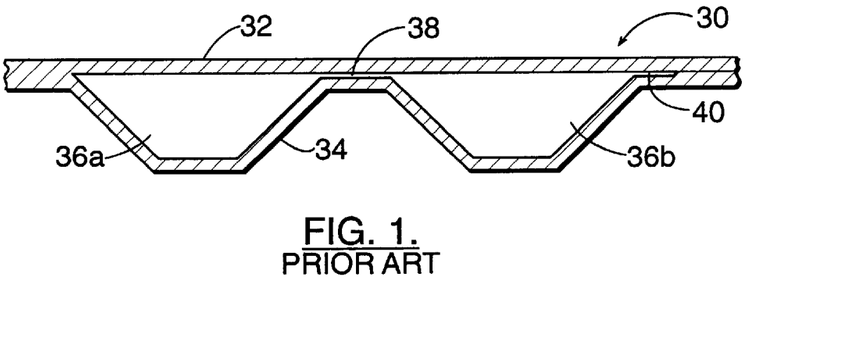
FIG. 1 is a cross-sectional view of a portion of a prior art two sheet panel typical of those formed between rigid dies, showing failed diffusion bonding.

Referring to the drawings more particularly by reference numbers, number 30 in FIG. 1 refers to a two-sheet SPF/DB structure like those typically constructed with solid forming dies. The structure 30 has a face sheet 32, which if not flat, only has gradual curvature there across and a reinforcing sheet 34 with reinforcing rib cavities 36a and 36b formed therein. The dies used to form the assembly 30 did not apply even pressure over those areas that were to be diffusion bonded, hence the gap 38 between the sheets 32 and 34 between cavities 36a and 36b, and the unbonded area 40 adjacent cavity 36b.

Figure 2:
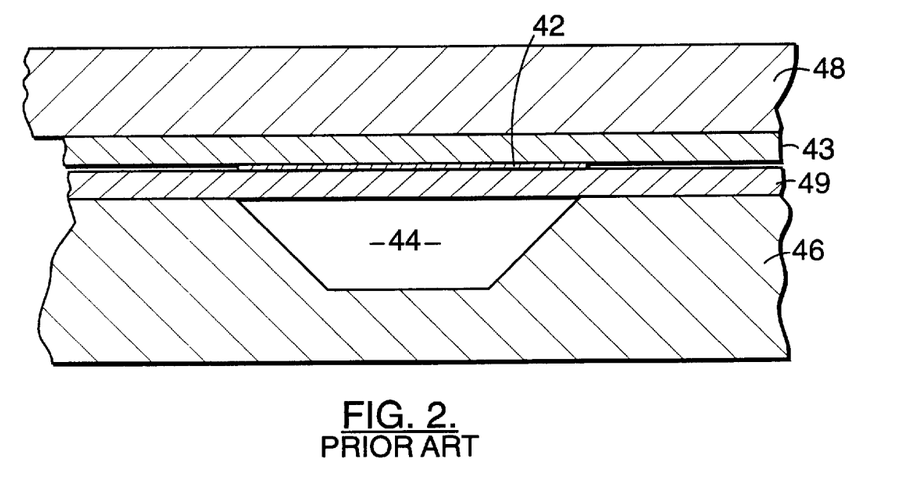
FIG. 2 is a cross-sectional view of dies and two sheets in a prior art process that uses maskant.
Figure 3:
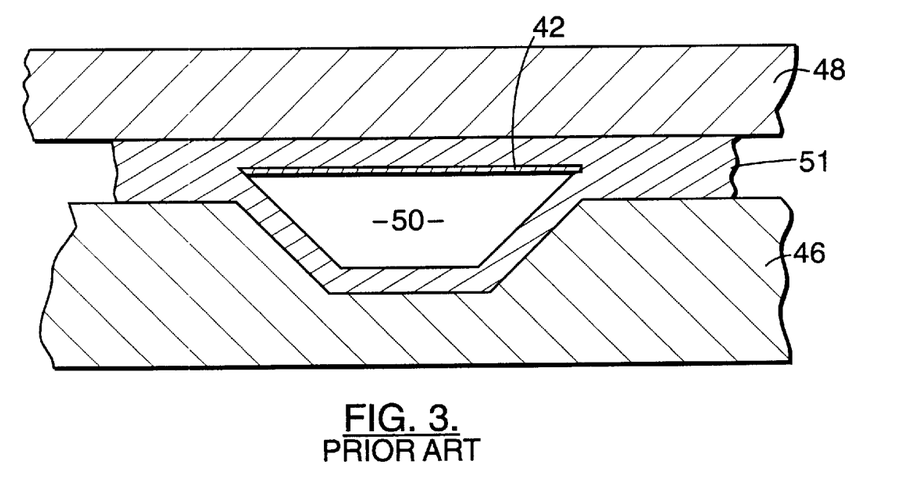
FIG. 3 is a cross-sectional view of a portion of a panel correctly formed using the process of FIG. 2.
Figure 4:
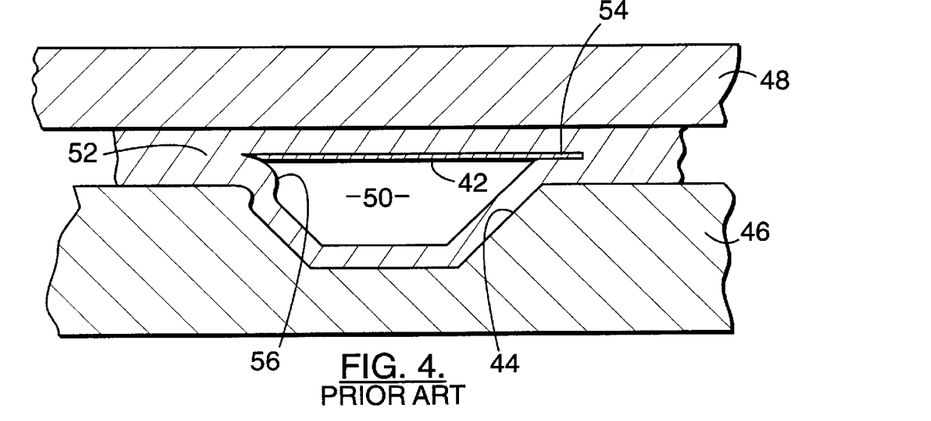
FIG. 4 is a cross-sectional view of a portion of a defective panel formed using the process of FIG. 2 illustrating the result when the maskant is misaligned with the dies.

A common method used to form two sheet panels, like assembly 30, is shown in FIG. 2 wherein a layer of maskant 42, which prevents diffusion bonding, has been applied to the face sheet 43 in alignment with the die cavity 44 in the lower die 46. When properly performed, the maskant process proceeds as shown in FIG. 3 where sufficient pressure is applied between the dies 46 and 48 to assure diffusion bonding between the face sheet 43 and the reinforcing sheet 49, while the maskant 42 allows the cavity 50 to be formed in the proper position to fabricate panel 51. As shown in FIG. 4, it is very difficult to align the maskant 42 with the cavity 44 in the die 46. With misalignment, either lateral, longitudinal or rotational, diffusion bonding occurs in areas 52 adjacent the cavity 44 where it is not desired and does not occur in areas 54 where it is desired, resulting in a deformed cavity area 56 of the cavity 50 and the unbonded area 54. Normally, the maskant 42 is applied with a silk screen process in which it is progressively more difficult to accurately position the maskant 42 as the parts to be constructed have smaller radii and/or more complex compound curvatures.

Figure 5:
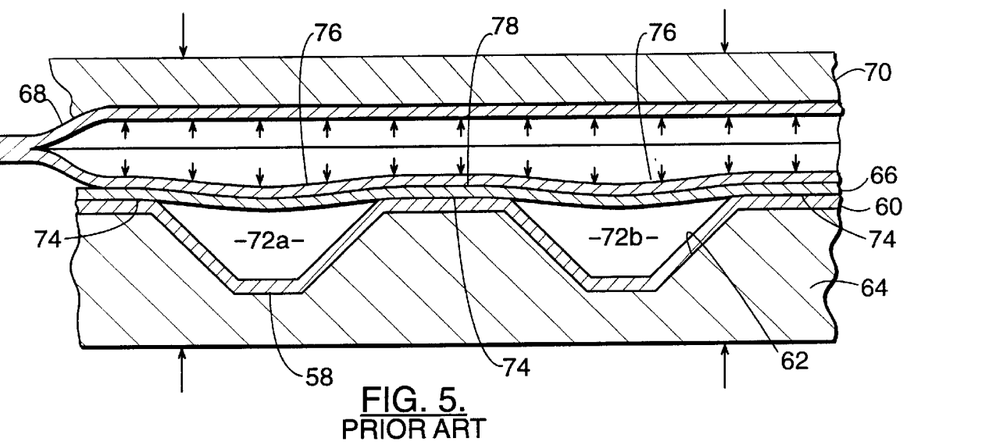
FIG. 5 is a cross-sectional view of a two sheet panel being formed with the prior art process described by Schier et al.

The difficulties with maskant, thermal expansion, and die design resulted in the process and tooling by Schier et al. used to make the panel 58 shown in FIG. 5 wherein a reinforcing sheet 60 is superplastically formed into the cavities 62 of a die 64 and a face sheet 66 is diffusion bonded to the formed reinforcement sheet 60 by means of a stainless steel bag 68, which applies pressure to the sheet 66, either directly or through an intervening flexible die sheet (not shown), by expanding between the sheet 66 and an upper die member 70 when pressurized. The advantage of the process shown in FIG. 5 is that the die members 64 and 70 do not have to be precisely matched. The pressure within the panel cavities 72a and 72b must be reduced below the pressure in the bag 68 to assure diffusion bonding between the sheets 60 and 66 in the areas of contact 74 positioned between the cavities 72a and 72b. During the diffusion bonding, the bag 68 has a tendency to deform the sheet 66 into the cavities 72a and 72b, as shown, resulting in a finished panel 58 having undesirable dimples 76 in what is usually its outer surface 78.

Figure 6:
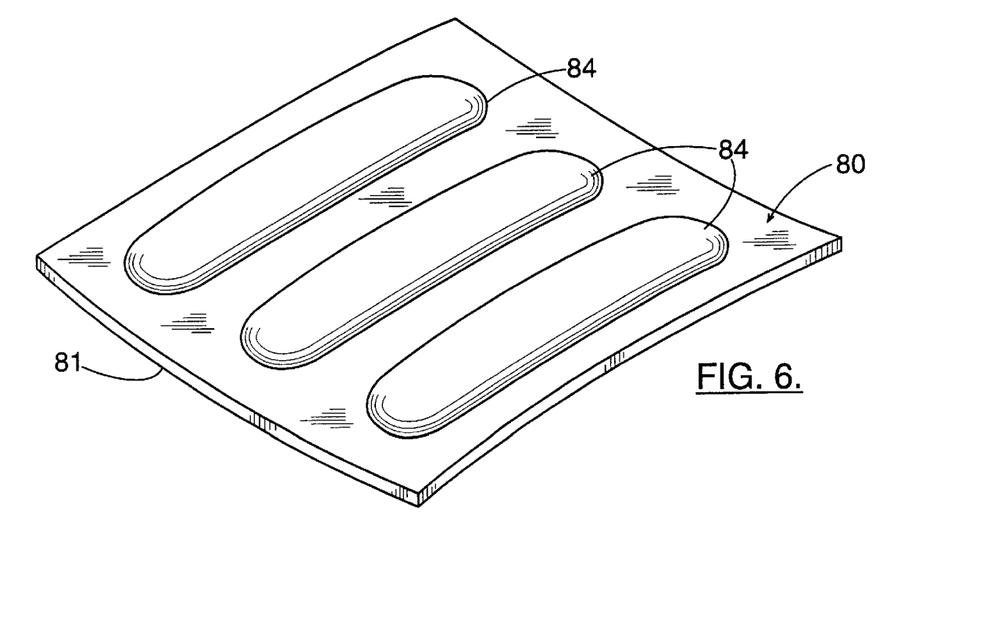
FIG. 6A is a perspective view of a panel incorporating the beaded panel reinforcing structures.
FIG. 6B is a cross-sectional view of the beaded panel section of FIG. 6A before diffusion bonding.
Figure 6B:
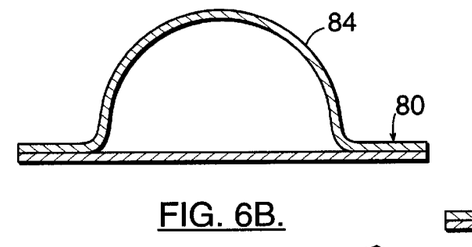
Figure 7A:
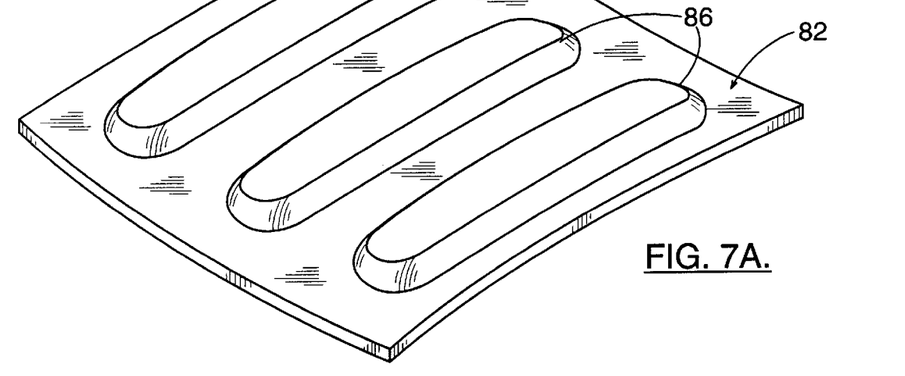
FIG. 7A is a perspective view of a panel incorporating hat section panel reinforcing structures.
Figure 7B:
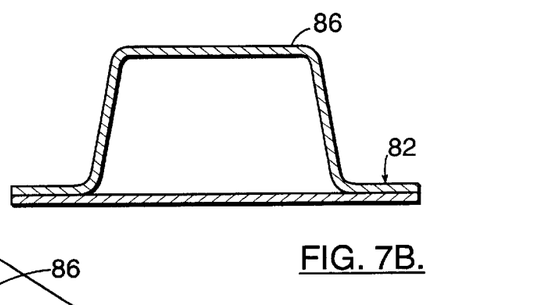
FIG. 7B is a cross-sectional view of the hat section panel section of FIG. 7A before diffusion bonding.

The present invention solves the problems discussed with respect to FIGS. 1 through 5 by superplastically forming and diffusion bonding two sheets to form reinforcing ribs or cavities while not requiring maskant, not requiring precise die design, not producing a face sheet with a deformed outer surface, and not requiring face sheet surface machining other than slight chemical milling to remove surface oxidation. As shown, the two-sheet panel 80 of FIGS. 6A and 6B, which has a slightly compound curved face surface 81, and the panel 82 of FIGS. 7A and 7B, normally have either beaded reinforcing ribs 84 with semi-circular cross-sections or hat section reinforcing ribs 86.

Figure 8A:
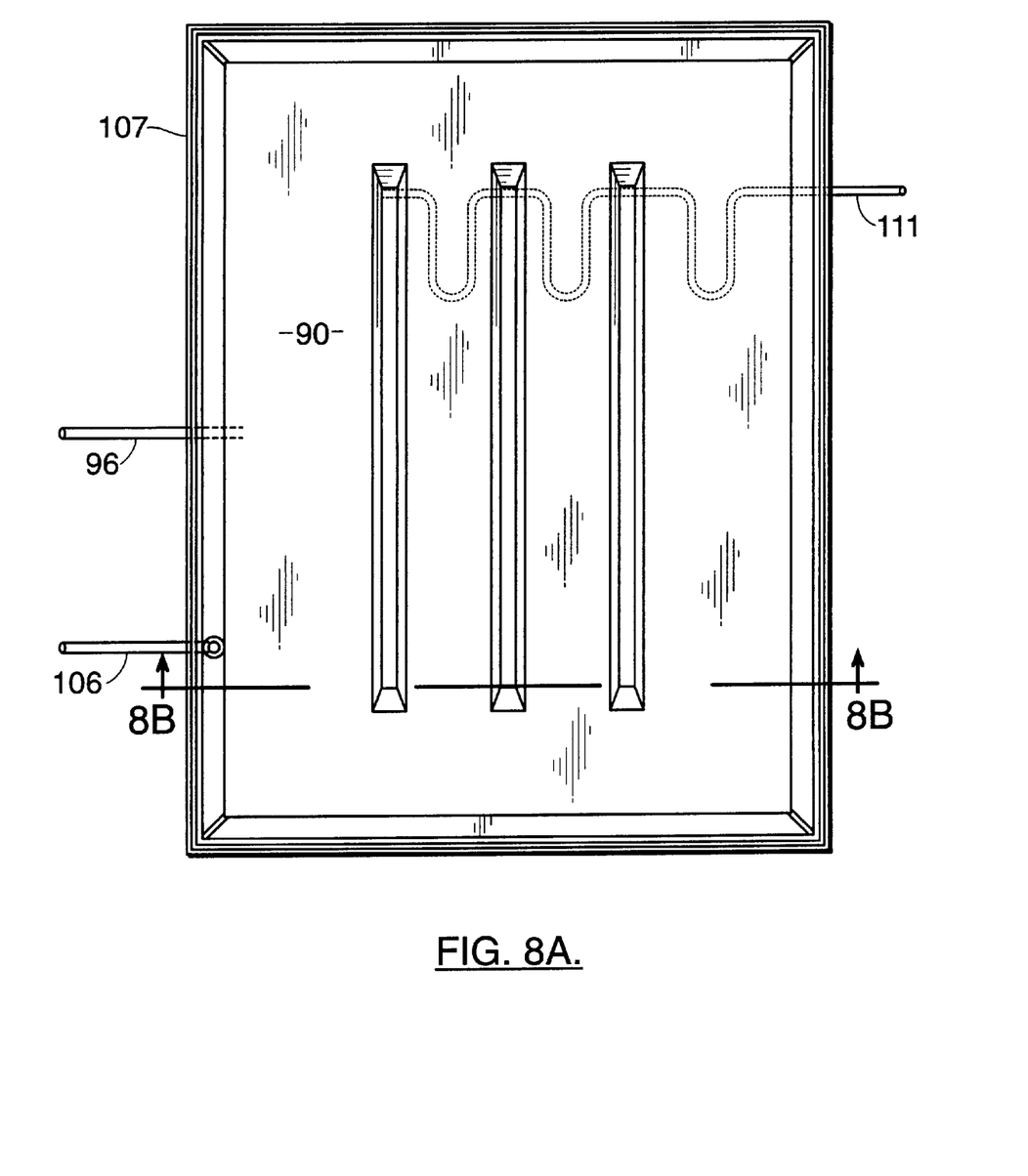
FIG. 8A is a top plan view of the dies and box assembly used to perform the present process.
Figure 8B:
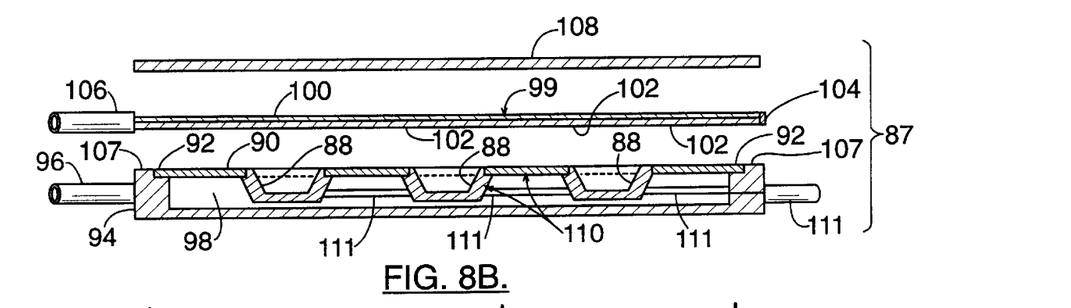
FIG. 8B is a side elevational cross-sectional view taken at line 8B—8B of FIG. 8A of the dies and box assembly used to perform the present process being loaded with a forming pack that includes a face sheet and a reinforcing sheet.

FIGS. 8A and 8B show the die assembly 87 used in practicing the present invention to form the two-sheet panel 82 with hat section ribs 86, although either panel, 80 or 82 can be made with similar tooling. The assembly 87 includes cavity forming bars 88 held in a relatively flexible, stainless steel retaining sheet 90 that is attached and sealed at its edges 92 to a forming box 94. The cavity forming bars 88 and the retaining sheet 90 are moveable and float in response to gas pressure applied through gas tube 96 into the gas chamber 98 formed by the box 94, the bars 88, and the flexible retaining sheet 90.

A forming pack 99, including a face sheet 100 and a reinforcing sheet 102, is sealed about its edges 104 by welding except for a forming gas inlet tube 106 connected to feed gas between the sheets 100 and 102. The forming pack 99 is positioned between the upwardly facing edge surface 107 of the box 94 and a rigid top die 108, which is pressed down against the box 94 and the flexible forming die 110, formed by the cavity forming bars 88 and the retaining sheet 90.

Figure 9:
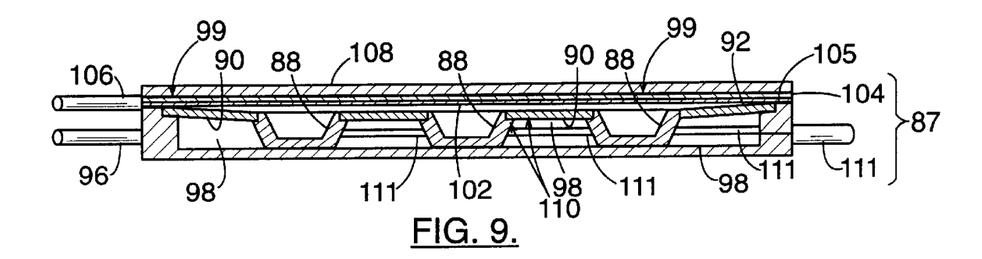
FIG. 9 is a side elevational cross-sectional view of the dies and box assembly of FIG. 8B at the start of the present forming process.
Figure 10:
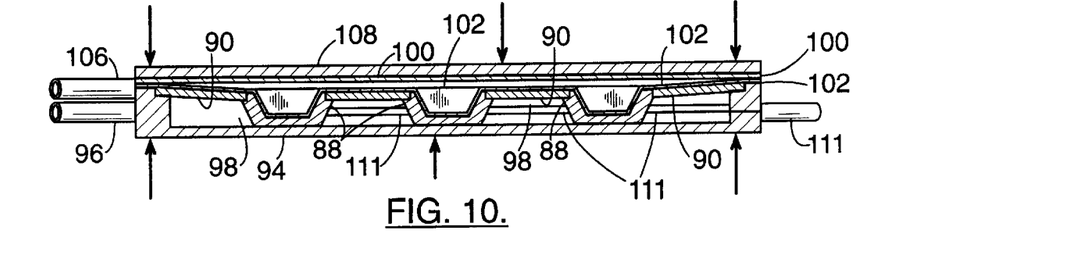
FIG. 10 is a side elevational cross-sectional view of the dies and box assembly of FIG. 8B after the reinforcing sheet has been superplastically formed.

The forming pack 99 and die assembly 87, as shown in FIG. 9, is then heated to superplastic forming temperatures and the forming pack 99 is inflated with pressurized inert gas through the gas inlet tube 106. This expands sheet 102 into the cavity forming bars 88, as shown in FIG. 10. As sheet 102 is being formed, close to equal pressure is applied into the gas chamber 98 through the tube 96 to prevent excessive deflection of the retaining sheet 90 and the cavity forming bars 88 are vented through tubes 111 so the reinforcing sheet 102 is unimpeded in its formation into the bars 88.

Figure 11:
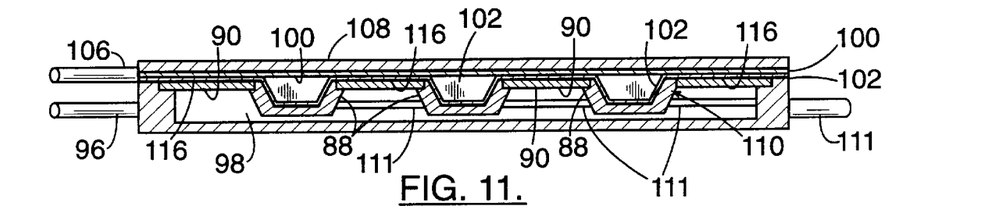
FIG. 11 is a side elevational cross-sectional view of the dies and box assembly of FIG. 8B at the start of diffusion bonding of the reinforcing sheet to the face sheet.
Figure 12:
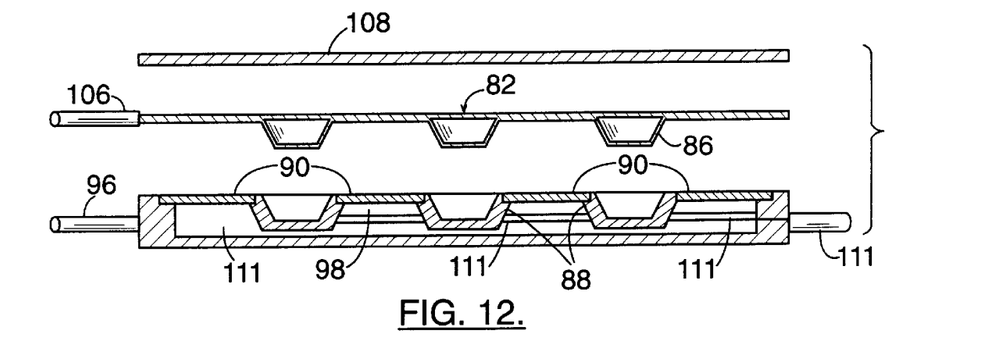
FIG. 12 is a side elevational cross-sectional view of the dies and box assembly of FIG. 8B opened at the end of the process showing a finished panel ready for trimming.

After sheet 102 has been formed, the pressure within the box gas chamber 98 is maintained and the pressure applied through tube 106 is reduced. This causes the cavity retaining sheet 90 to lift as shown in FIG. 11 even though a minimum forming pressure is being applied through tube 106 to prevent unwanted deformation of the sheets 100 and 102. The differential pressure applied between tubes 96 and 106 maintains diffusion bonding pressure in the areas 116 between the sheets 100 and 102. Once diffusion bonding has occurred, the temperature is reduced below superplastic forming and metal oxidation temperature, and the forming pressure and the pressure in the gas chamber 98 are vented through tubes 106 and 96. The die 108 is lifted and the finished panel 82 is removed, ready for edge trimming and chemical milling. Diffusion bonding is assured because of the even pressure applied pneumatically across the die 110.

Figure 13:
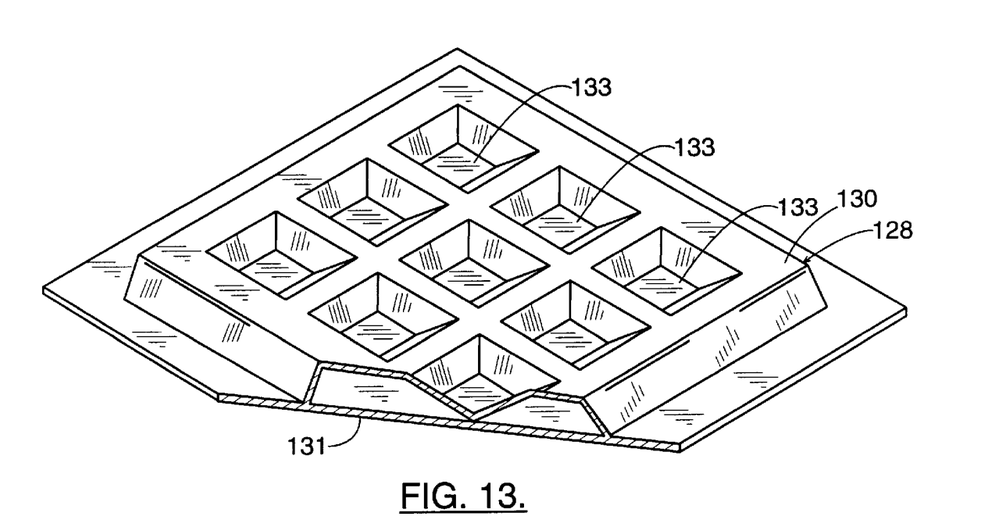
FIG. 13 is a perspective partial cross-sectional view of a waffle-shaped SPF/DB panel structure formed by a modified version of the present invention.
Figure 14:
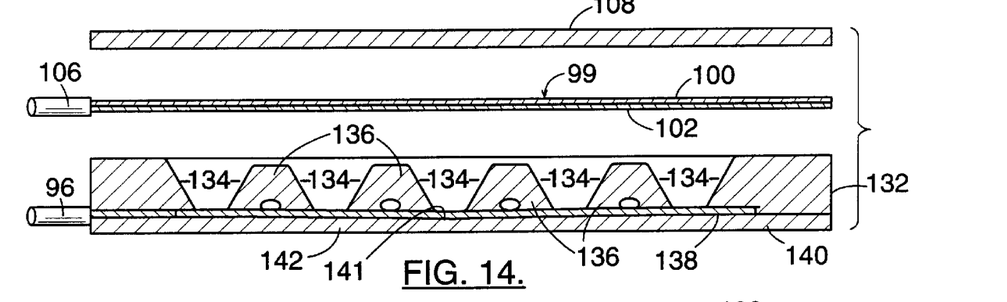
FIG. 14 is a side elevational cross-sectional view of the dies and box assembly used to form the panel structure of FIG. 13, being loaded with a forming pack that includes a face sheet and a reinforcing sheet.

A two-sheet SPF/DB panel 128, as shown in FIG. 13, with a waffle shaped reinforcing sheet 130 and the planar face sheet 131 can be constructed with the same process as described above and a slightly different reinforcing sheet forming die 132, as shown in FIG. 14, so that dimples 133 are formed in a grid. Cavities 134 are formed between shaped blocks 136 attached to a relatively flexible, block retaining sheet 138. The block 136, retaining sheet 138, and a base plate 140 forms the die 132. When the dimples 133 are to be the same height, the plate 140 is machined with a slightly depressed area 141, which with the retaining sheet 138, forms a gas chamber 142 which can be pressurized with inert gas through the tube 143. Otherwise, to eliminate a die machining step, the blocks 136 can be slightly short (about 30 thousandths of an inch) and the depressed area 141 eliminated. This results in a slight dishing of the waffle shaped reinforcing sheet 130.

Figure 15:
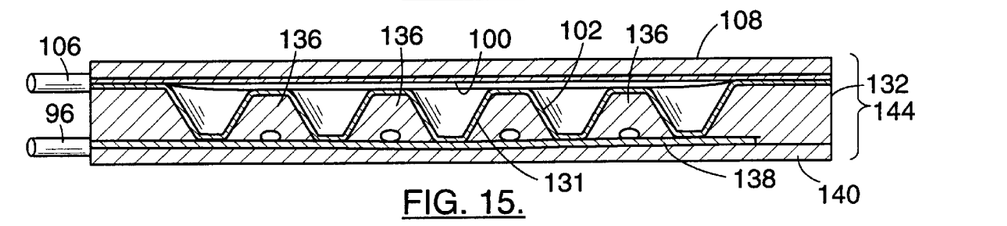
FIG. 15 is a side elevational cross-sectional view of the dies and box assembly of FIG. 14 after the reinforcing sheet has been superplastically formed.
Figure 16:
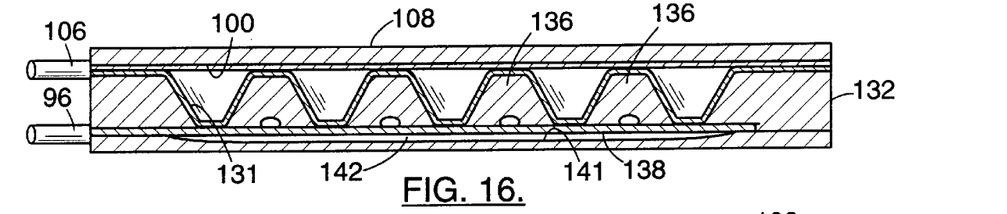
FIG. 16 is a side elevational cross-sectional view of the dies and box assembly of FIG. 14 at the start of diffusion bonding of the reinforcing sheet to the face sheet.
Figure 17:
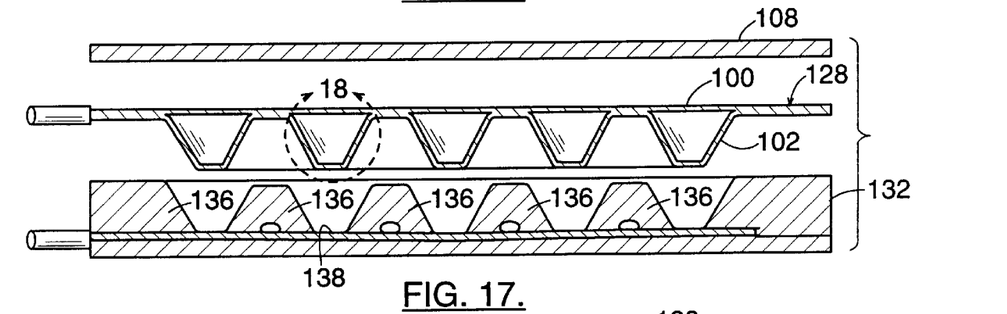
FIG. 17 is a side elevational cross-sectional view of the dies and box assembly of FIG. 14 opened at the end of the process showing a finished panel ready for trimming.

As shown in FIG. 15, the rigid die 108 and flexible die 132 are positioned with the forming pack 99 in-between. The assembly 144, so formed, is heated to superplastic forming temperatures, normally in the range of 1450 to 1700° F. Pressurized gas is then introduced through tube 106 to expand sheet 102 over the blocks 136 and into the cavities 134. After the sheet 102 has been formed into waffled reinforcing sheet 131, the floating forming die 132, including the retaining sheet 138 and the blocks 136, is lifted against the rigid top die 108 by pressurizing the gas chamber 142 through tube 96, as shown in FIG. 16. The temperature is raised slightly (about 50° F.) and the pressure between the sheets 100 and 131 is maintained below the pressure in the gas chamber 142, the differential pressure so created thereby applying diffusion bonding force between the sheets 100 and 131. The diffusion bonding force appears because the pressure in the gas chamber 142 moves the flexible sheet 138, the blocks 136, and the formed reinforcing sheet 131 against the sheet 100 whose position is fixed by the rigid die 108. The actual pressure values can vary, depending on part geometry. As before, the pressures are released after the temperature has been reduced below superplastic forming and material oxidation temperature. The die assembly 144 is opened (FIG. 17) and the panel 128, ready for edge trimming and chemical milling, is removed.

Figure 18:
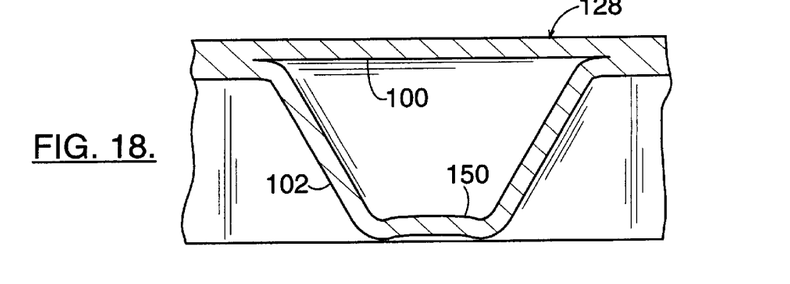
FIG. 18 is an enlarged cross-sectional view taken in area 18—18 of FIG. 17.

If the pressure in the gas chamber 142 causes the retaining sheet 138 to bow upwardly between the blocks 136, the face sheet 100 is unaffected and the grid 150 between the cavities 134 (FIG. 18) becomes compound curved for additional strength. The grid 150 can be from becoming compound curved by maintaining pressure in the tube 106 just below the pressure in the chamber 142 during the diffusion bonding operation.

Thus, there has been shown and described novel process and tooling for forming two sheet SPF/DB panels, which fulfill all the objects and advantages sought therefor. Many applications of the subject process and tooling will become apparent to those skilled in the art after considering this specification together with the accompanying drawings. All such changes, alterations and modifications, which do not depart from the spirit and scope of the invention are deemed to be covered by the invention, which is limited only by the claims that follow.

I claim:

1. A panel having:
   a first substantially smooth face surface; and
   a second opposite surface including:
      at least one reinforcing protrusion, said at least one reinforcing protrusion defining a stiffening dimple; and
      cavities between said reinforcing protrusions and said first substantially smooth face surface, said panel being constructed by:
   forming a forming pack of a face sheet, a reinforcing sheet, and means to supply pressurized gas between the face sheet and the reinforcing sheet, the face sheet and the reinforcing sheet being of material that is superplastically formable;
   placing the forming pack between a rigid face sheet die and a flexible reinforcing sheet die, the flexible reinforcing sheet die including a die box for engagement with the reinforcing sheet, the die box including at least one protrusion forming member and a flexible sheet sealably supported to the die box and in engagement with the at least one protrusion forming member;
   heating the forming pack to superplastic forming temperature;
   applying pressure between the face sheet and the reinforcing sheet to form said cavities in the reinforcing sheet; and
   applying pressure to the gas chamber to move the reinforcing sheet into forceful engagement with the face sheet to bond the sheets together at areas of contact to form said panel and to cause the at least one protrusion forming member to flex thereby forming said stiffening dimple in said at least one reinforcing protrusion.

2. The panel as defined in claim 1 wherein the material of the sheets is diffusion bondable, wherein the heating includes:
   heating to diffusion bonding temperature, and wherein the application of pressurized gas to the gas chamber to move the reinforcing sheet into forceful engagement with the face sheet to bond the sheets together at areas of contact to form a panel includes:
   applying diffusion bonding pressure.

3. The panel as defined in claim 1 wherein the at least one protrusion forming member is mounted through the flexible sheet.

4. The panel as defined in claim 1 wherein the at least one protrusion forming member is a channel shaped member mounted through the flexible sheet and defining a portion of the gas chamber.

5. The panel as defined in claim 1 wherein the at least one protrusion forming member is a block member mounted on the flexible sheet opposite the gas chamber.

6. The panel as defined in claim 1 wherein the heating includes:
   heating to brazing temperature, and wherein the application of pressure to the gas chamber to move the reinforcing sheet into forceful engagement with the face sheet to bond the sheets together at areas of contact to form a panel includes:
   applying brazing pressure.

7. The panel as defined in claim 1 wherein the first substantially smooth face surface is curved.

8. A die tool for the production of two sheet superplastically formed and bonded panels having a substantially smooth face surface comprising:
   a rigid face sheet die having a substantially smooth first surface for engagement with a first side of a two sheet forming pack, the first side defining the face surface of the panel; and
   a die box for engagement with a second opposite side of the two sheet forming pack, the die box comprising:
      at least one cavity forming member; and
      a flexible sheet sealably supported to said box and in engagement with said at least one cavity forming member, said die box and at least said flexible sheet forming a gas chamber, whereby pressurization of said gas chamber forces said at least one cavity forming member toward the substantially smooth first surface of said rigid face sheet die to thereby selectively bond the two sheet forming pack without deforming the first side of the two sheet forming pack such that the first side is substantially smooth.

9. The die tool for the production of two sheet superplastically formed and bonded panels as defined in claim 8 wherein said at least one cavity forming member is mounted through said flexible sheet.

10. The die tool for the production of two sheet superplastically formed and bonded panels as defined in claim 8 wherein said at least one cavity forming member is a channel shaped member mounted through said flexible sheet and defining a portion of said gas chamber, said tool further including:
   a vent to said at least one cavity forming member to allow relief of pressure therein when a sheet of the forming pack is deformed therein.

11. The die tool for the production of two sheet superplastically formed and bonded panels as defined in claim 8 wherein said at least one cavity forming member is a block member mounted to said flexible sheet opposite said gas chamber.

12. The die tool for the production of two sheet superplastically formed and bonded panels as defined in claim 8 wherein said at least one cavity forming member has a semi-circular cross-section.

13. The die tool for the production of two sheet superplastically formed and bonded panels as defined in claim 8 wherein said at least one cavity forming member has a hat shaped cross-section.

14. A method of producing a superplastically formed and bonded panel defining a substantially smooth face surface including:
   forming a forming pack of a face sheet, a reinforcing sheet, and means to supply pressurized gas between the face sheet and the reinforcing sheet, the face sheet and the reinforcing sheet being of material that is superplastically formable;

placing the forming pack between a rigid face sheet die and a flexible reinforcing sheet die, the rigid face sheet die having a substantially smooth first surface for engagement with the face sheet, the flexible reinforcing sheet die including a die box for engagement with the reinforcing sheet, the die box including at least one cavity forming member and a flexible sheet sealably supported to the die box and in engagement with the at least one cavity forming member;

heating the forming pack to superplastic forming temperature;

applying pressure between the face sheet and the reinforcing sheet to deform the reinforcing sheet into the at least one cavity forming member; and applying pressure to the gas chamber to move portions of the reinforcing sheet into forceful engagement with the face sheet which is supported by the substantially smooth first surface of the rigid face sheet die to bond the sheets together at areas of contact without deforming the face sheet to form a panel having a substantially smooth face surface.

15. The method of producing a superplastically formed and bonded panel as defined in claim 14 wherein the material of the sheets is diffusion bondable, and wherein the heating of the forming pack includes:

heating to diffusion bonding temperature, and wherein the application of pressurized gas to the gas chamber to move the reinforcing sheet into forceful engagement with the face sheet to bond the sheets together at areas of contact to form a panel includes:

applying diffusion bonding pressure.

16. The method of producing a superplastically formed and bonded panel as defined in claim 14 wherein the at least one cavity forming member is mounted through the flexible sheet.

17. The method of producing a superplastically formed and bonded panel as defined in claim 14 wherein the at least one cavity forming member is a channel shaped member mounted through the flexible sheet and defining a portion of the gas chamber.

18. The method of producing a superplastically formed and bonded panel as defined in claim 14 wherein the at least one cavity forming member is a block member mounted to the flexible sheet opposite the gas chamber.

19. The method of producing a superplastically formed and bonded panel as defined in claim 14 wherein the heating includes:

heating to brazing temperature, and wherein the application of pressure to the gas chamber to move the reinforcing sheet into forceful engagement with the face sheet to bond the sheets together at areas of contact to form a panel includes:

applying brazing pressure.

* * * * *

UNITED STATES PATENT AND TRADEMARK OFFICE
CERTIFICATE OF CORRECTION

PATENT NO. : 5,904,992

DATED : May 18, 1999

INVENTOR(S) : Yasui

It is certified that error appears in the above-identified patent and that said Letters Patent is hereby corrected as shown below:

Title page, item [56], in the References Cited, U.S. PATENT DOCUMENTS, line 3, "Copper et al." should read --Cooper et al.--.

Signed and Sealed this

Seventh Day of March, 2000

Attest:

Q. TODD DICKINSON

*Attesting Officer*     *Commissioner of Patents and Trademarks*